US006991719B2

(12) United States Patent
Ovshinsky et al.

(10) Patent No.: US 6,991,719 B2
(45) Date of Patent: Jan. 31, 2006

(54) METHOD FOR PRODUCING AND TRANSPORTING HYDROGEN

(75) Inventors: Stanford R. Ovshinsky, Bloomfield Hills, MI (US); Srinivasan Venkatesan, Southfield, MI (US); Hong Wang, Troy, MI (US); Subhash K. Dhar, Bloomfield, MI (US)

(73) Assignee: Texaco Ovonic Fuel Cell LLC, Rochester Hills, MI (US)

( * ) Notice: Subject to any disclaimer, the term of this patent is extended or adjusted under 35 U.S.C. 154(b) by 316 days.

(21) Appl. No.: 10/436,513

(22) Filed: May 13, 2003

(65) Prior Publication Data

US 2004/0226830 A1 Nov. 18, 2004

(51) Int. Cl.
*C25B 1/02* (2006.01)
(52) U.S. Cl. .................................. 205/638; 205/637
(58) Field of Classification Search ................ 205/638, 205/637; 204/268
See application file for complete search history.

(56) References Cited

U.S. PATENT DOCUMENTS

| 4,537,674 A | 8/1985 | Ovshinsky et al. |
| 6,328,861 B1 * | 12/2001 | Yoshida et al. ............. 204/252 |
| 6,830,725 B2 * | 12/2004 | Fetcenko et al. ........... 420/580 |

OTHER PUBLICATIONS

Sokes, R. A. "Solar Energy" Kirk-Othmer Encyclopedia of Chemical Technology. 1997, John Wiley and Sons, Inc. Acessed online DOI: 10.1002/0471238961.1915120119201511.a01.*

* cited by examiner

*Primary Examiner*—Roy King
*Assistant Examiner*—Nira Birenbaum
(74) *Attorney, Agent, or Firm*—Frederick W. Mau, II; Marvin S. Siskind

(57) ABSTRACT

A method for the production and storage of hydrogen. The hydrogen is produced via electrolysis and as the hydrogen is formed it is absorbed into a hydrogen storing cathode. Once the hydrogen storing cathode has become completely hydrided, it is shipped to end users as a metal hydride supply of hydrogen.

18 Claims, 2 Drawing Sheets

METHOD FOR PRODUCING AND TRANSPORTING HYDROGEN

FIELD OF THE INVENTION

The present invention relates to a method for producing hydrogen and transporting hydrogen. More particularly, the present invention relates to a method for producing hydrogen via electrolysis and transporting the hydrogen to end users in metal hydride form.

BACKGROUND

Considerable attention has been given to the use of hydrogen as a fuel or fuel supplement. While the world's oil reserves are rapidly being depleted, the supply of hydrogen remains virtually unlimited. Hydrogen, although presently more expensive than petroleum, is a relatively low cost fuel. Hydrogen has the highest density of energy per unit weight of any chemical fuel and is essentially non-polluting since the main by-product of burning hydrogen is water.

Typically, hydrogen is produced by a variety of methods such as water electrolysis, steam reforming, cracking hydrocarbons, or cracking ammonia. In all of these cases, the hydrogen that is produced is dried and cleaned of all contaminants and then either compressed at high pressure, liquified, or stored in an alloy as a hydride material. All methods, however, have benefits and disadvantages. Those methods that use fossil fuels as a starting raw material for hydrogen production have a built in disadvantage in that they produce carbon monoxide and carbon dioxide as part of their hydrogen generation which pollute the atmosphere. In addition, fossil fuel availability is limited and the remaining reserves are better used for other industrial chemical use than being used as fuel. Water electrolysis is preferred, because there is an unlimited supply of water and water electrolysis produces no pollution. Although energy intensive, water electrolysis can be performed using electricity from any source such as off peak power, solar power, geothermal power, or wind power. It is also recognized that the purest form of hydrogen is produced via water electrolysis.

Electrolysis is the electrolytic decomposition of water in an electrolyte and has long been practiced for the production of hydrogen gas. Traditionally, alkaline solutions have been used for electrolysis for the production of hydrogen. Hydrogen is also evolved as a byproduct of certain other industrial electrolysis processes such as chlorine production. The major components of the electrochemical cell in which electrolysis takes place include an anode and a cathode which are in contact with an electrolytic solution, and a separator used to separate the anode and cathode and their reaction products. In operation, the selected electrolyte, such as NaOH, KOH, or $H_2SO_4$, is continually fed into the cell and a voltage is applied across the anode and cathode. This produces electrochemical reactions which take place at the anode and cathode to form oxygen and hydrogen gas. The overall reactions are represented as:

Anode: $2OH^- \rightarrow \tfrac{1}{2}O_2 + 2e^- + H_2O$

Cathode: $2H_2O + 2e^- \rightarrow H_2 + 2OH^-$

Total: $H_2O \rightarrow H_2 + \tfrac{1}{2}O_2$

When hydrogen is produced, it is collected, stored, and transported to end users. Hydrogen may be stored in gas, liquid, or solid (hydride) form. Storage of hydrogen as a compressed gas involves the use of large and heavy vessels. Additionally, large and very expensive compressors are required to store hydrogen as a compressed gas, and compressed hydrogen gas is an explosion/fire hazard. Hydrogen also can be stored as a liquid. Storage as a liquid, however, presents a serious safety problem when used as a fuel for motor vehicles since liquid hydrogen is extremely dangerous and presents a potential explosion hazard. Liquid hydrogen also must be kept extremely cold, below −253° C., and is highly volatile if spilled. Moreover, liquid hydrogen is expensive to produce and the energy necessary for the liquefaction process is a major fraction of the energy that can be generated by burning the hydrogen. Another drawback to storage as a liquid is the costly losses of hydrogen due to evaporation, which can be as high as 5% per day.

In addition to the problems associated with storage of gaseous or liquid hydrogen, there are also problems associated with the transport of hydrogen in such forms. For instance transport of liquid hydrogen will require super-insulated tanks, which will be heavy and bulky and will be susceptible to rupturing and explosion. Also, a portion of the liquid hydrogen will be required to remain in the tanks at all times to avoid heating-up and cooling down of the tank which would incur big thermal losses. As for gaseous hydrogen transportation, pressurized tankers could be used for smaller quantities of hydrogen, but these too will be susceptible to rupturing and explosion. For larger quantities, a whole new hydrogen pipeline transportation system would need to be constructed or the compressor stations, valves and gaskets of the existing pipeline systems for natural gas will have to be adapted and retrofitted to hydrogen use. This assumes, of course, that the construction material of these existing pipelines will be suited to hydrogen transportation. Hydrogen is known to permeate through many materials. In high strength steels, hydrogen induced cracking is common.

Certain metals and alloys have been known to permit reversible storage and release of hydrogen. In this regard, they have been considered as superior hydrogen storage material, due to their high hydrogen storage capacity. Storage of hydrogen as a solid hydride can provide a greater volumetric storage density than storage as a compressed gas or a liquid in pressure tanks. Also, hydrogen storage in a solid hydride presents fewer safety problems than those caused by hydrogen stored in containers as a gas or a liquid. Solid-phase metal or alloy system can store large amounts of hydrogen by absorbing hydrogen with a high density and by forming a metal hydride under a specific temperature/pressure or electrochemical conditions, and hydrogen can be released by changing these conditions. Metal hydride systems have the advantage of high-density hydrogen-storage for long periods of time, since they are formed by the insertion of hydrogen atoms to the crystal lattice of a metal. A desirable hydrogen storage material must have a high gravimetric and volumetric density, a suitable desorption temperature/pressure, good kinetics, good reversibility, resistance to poisoning by contaminants including those present in the hydrogen gas and be of a relatively low cost. If the material fails to possess any one of these characteristics it will not be acceptable for wide scale commercial utilization.

Good reversibility is needed to enable the hydrogen storage material to be capable of repeated absorption-desorption cycles without significant loss of its hydrogen storage capabilities. Good kinetics are necessary to enable hydrogen to be absorbed or desorbed in a relatively short period of time. Resistance to contaminants to which the material may be subjected during manufacturing and utilization is required to prevent a degradation of acceptable performance.

Many metal alloys are recognized as having suitability for hydrogen storage in their atomic and crystalline structures as hydride materials. While this storage method holds promise to be ultimately convenient and safe; improvements in efficiency and safety are always welcome. This invention provides such improvement.

While metal hydrides are viewed as a viable way of safely and efficiently storing hydrogen, there is still a need for improved processes for collecting and transporting hydrogen to end users. As hydrogen is produced, it is normally collected, compressed and absorbed into hydrogen storage alloys for storage and transportation. By eliminating some of these steps, an efficient process of producing and transporting hydrogen may be realized which can both decrease cost of hydrogen production while providing for a safe and cost effective means of distributing hydrogen to end users.

SUMMARY OF THE INVENTION

The present invention discloses a method for the production and storage of hydrogen as a metal hydride comprising the steps of 1) producing hydrogen in an electrolytic cell by applying an electrical current across an anode and a hydrogen storing cathode comprising a hydrogen storage alloy both of which being in contact with an alkaline solution, 2) absorbing the hydrogen as it is produced with the hydrogen storing cathode thereby forming a metal hydride, 3) removing the hydrogen storing cathode from the electrolytic cell once the hydrogen storing cathode has become completely hydrided, 4) storing the one or more hydrogen storing cathodes in a pressure containment vessel adapted to supply hydrogen desorbed from the one or more hydrogen storing cathodes from the containment vessel, and 5) providing heat to the pressure containment vessel to desorb the hydrogen from the one or more hydrogen storing cathodes. The electrical current may be supplied from a non-fossil fuel source of power selected from solar power, wind power, hydroelectric power, geothermal power, and combinations thereof. The source of heat may be a heat exchanger, a fuel combustor, a catalytic combustor, or an exhaust stream.

The hydrogen storing cathode is generally comprised of a hydrogen storage alloy selected from Rare-earth alloys, Misch metal alloys, zirconium alloys, titanium alloys, magnesium/nickel alloys, and mixtures or alloys thereof.

The anode may be comprised of a substrate with a catalytic material deposited thereon. The substrate may be selected from metal sheet, expanded metal, foil, wire mesh, or screen. The substrate may also be formed from a material selected from the group consisting of nickel, steel, titanium, graphite, copper, or mixtures thereof. The catalytic material may comprise a host matrix composed of one or more transition metals selected from the group consisting of Co, Ni, and Mn. The catalytic material may further comprise one or more modifier elements selected from Co, Ni, Sr, Li, K, Sn, C, O, Mn, Al, and Ru.

The electrolytic cell may also include one or more bipolar electrodes positioned between the anode and the hydrogen storing cathode in the alkaline solution. The bipolar electrodes each having an anode side and a cathode side adapted to evolve and store hydrogen in metal hydride form. When utilizing bipolar electrodes, the bipolar electrodes produce and absorb hydrogen in hydride form and are removed and used as a source of hydrogen when fully hydrided as with the hydrogen storing cathodes.

DETAILED DESCRIPTION OF THE INVENTION

The present invention provides an improved method of collecting and transporting hydrogen produced via electrolysis to end users. The improved method eliminates the need for collecting the produced hydrogen, compressing the hydrogen, and transferring the hydrogen to a safe medium for transportation. The improved method produces hydrogen and immediately stores the hydrogen in a safe medium ready for transportation to end users.

Figure 1:
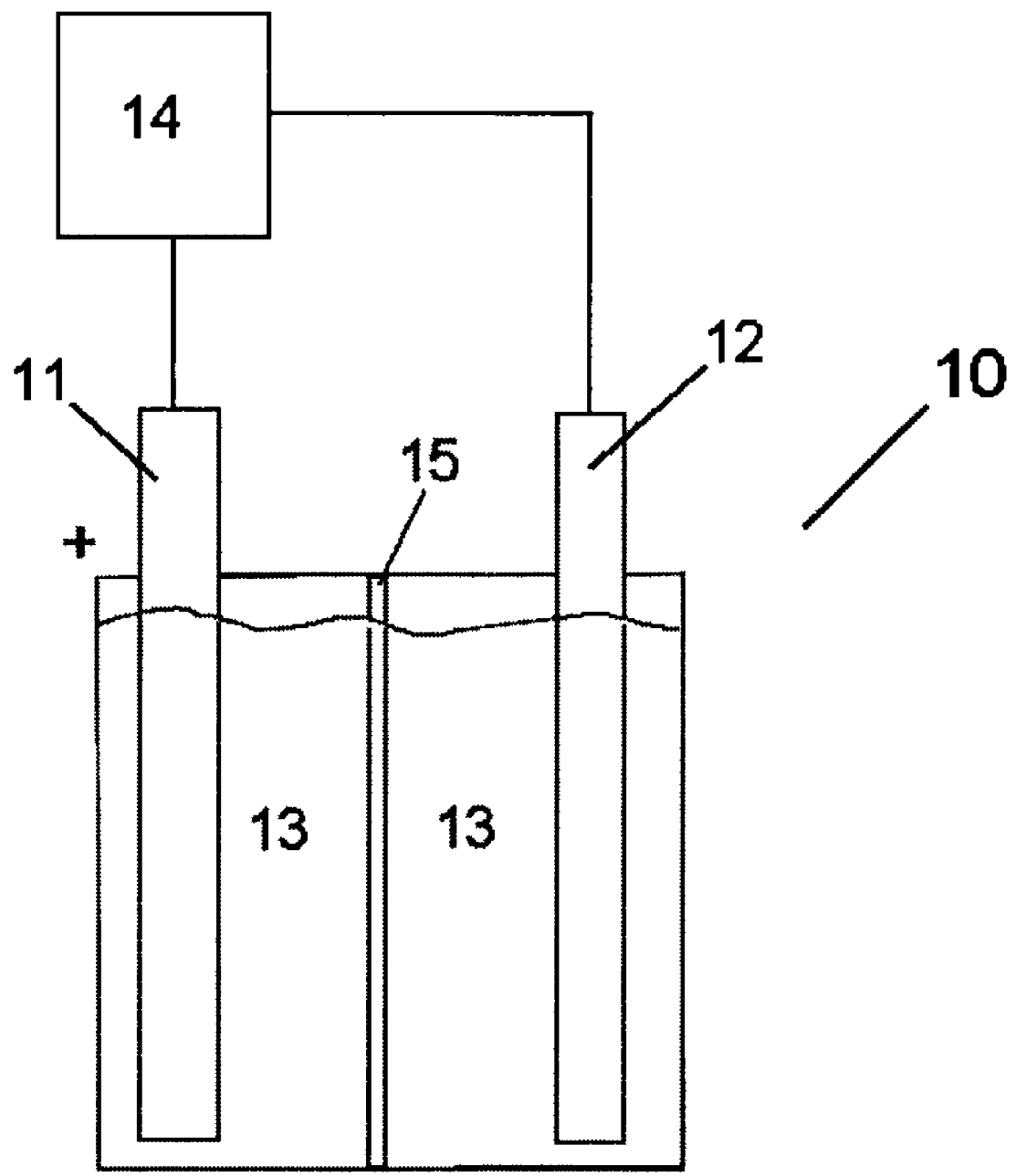
FIG. 1, is a depiction of an electrolytic cell as used in accordance with the present invention.

The electrolytic cell 10 as used in accordance with the present invention is depicted in FIG. 1. The electrolytic cell 10 includes an anode 11 and a cathode 12. The anode 11 and cathode 12 are placed in an electrolyte solution 13 and a current from a power source 14 is applied across the electrodes thereby forming hydrogen at the cathode 12 via electrolysis. The anode 11 and the cathode 12 may be separated by a membrane 15 which allows the transfer of hydroxyl ions and water from one side of the electrolytic cell to the other. The membrane 15 is used to prevent oxygen formed at the anode 11 from contacting and oxidizing the cathode 12, thus inhibiting performance of the cathode 12.

The anode 12 as used in accordance with the present invention generally be a substrate with an anode active material deposited thereon. Preferably, the anode has low overvoltage, good kinetics, good chemical and mechanical stability, good electrical conductivity, and low operating costs. The substrate may be a metal sheet, expanded metal, foil, wire mesh, or screen. The substrate may be formed from nickel, steel, titanium, graphite, copper, or mixtures thereof. Other materials may also be used providing they have a high conductivity and resistance to breakdown upon exposure to the conditions within the electrolytic cell. The anode active material may generally be a host matrix with modifier elements distributed therein. The host matrix is preferably composed of Co, Ni, Mn, or mixtures thereof with the modifier elements being selected from Co, Ni, Sr, Li, K, Sn, C, O, Mn, Al, and Ru. The anode active material may be applied onto the substrate via sputtering, vapor deposition, plasma deposition, or spraying. An example of this type of electrolysis anode is disclosed in U.S. Pat. No. 4,537,674, the disclosure of which is hereby incorporated by reference.

The cathode as used in accordance with the present invention may generally be composed cathode active material. The cathode active material may or may not be supported on a substrate material. The substrate may be a metal sheet, metal foam, expanded metal, foil, wire mesh, or screen. The substrate may be formed from nickel, steel, titanium, graphite, copper, or mixtures thereof. Other materials may also be used providing they have a high conductivity and resistance to breakdown upon exposure to the conditions within the electrolytic cell. The cathode active material is generally comprised of a hydrogen storage alloy.

The hydrogen storage material may be selected from Rare-earth metal alloys, Misch metal alloys, zirconium alloys, titanium alloys, magnesium/nickel alloys, and mixtures or alloys thereof which may be AB, $AB_2$, or $AB_5$ type alloys. Such alloys may include modifier elements to increase their hydrogen storage capability. An example of specific alloys useful as the cathode active material are alloys that contain enriched catalytic nickel regions of 50–70 Angstroms in diameter distributed throughout the oxide interface which vary in proximity from 2–300 Angstroms preferably 50–100 Angstroms, from region to region. As a result of these nickel regions, the materials exhibit significant catalysis and conductivity. The density of Ni regions in the alloys provide powder particles having an enriched Ni surface. The most preferred alloys having enriched Ni regions are alloys having the following composition:

$$(Mm)_a Ni_b Co_c Mn_d Al_e$$

where Mm is a Misch Metal comprising 60 to 67 atomic percent La, 25 to 30 weight percent Ce, 0 to 5 weight percent Pr, 0 to 10 weight percent Nd; b is 45 to 55 weight percent; c is 8 to 12 weight percent; d is 0 to 5.0 weight percent; e is 0 to 2.0 weight percent; and a+b+c+d+e=100 weight percent.

Preferably, the cathode has a high porosity allowing access to catalytic centers thereby providing a high charging efficiency within the cathode. Modifier elements which work particularly well to increase the performance of the cathode are aluminum and zinc, which are incorporated into the cathode and leached out using an alkaline solution to increase the porosity of the cathode.

The cathode may be designed accordingly to meet system requirements. The amount of hydrogen storage alloy within the cathode is variable depending on hydrogen storage requirements. The dimensions and shape of the cathode may also be varied accordingly to hydrogen storage requirements and design of the vessel into which the cathode is placed. The cathode may also have one or more flow channels extending throughout its structure aiding in the absorption and desorption of hydrogen from areas within the cathode.

To produce and store hydrogen via electrolysis in accordance with the present invention, an anode and hydrogen storing cathode are placed in an aqueous alkaline solution and an electrical current from a power source is applied across the electrodes in the electrolytic cell 10 as shown in FIG. 1. At the anode 11, hydroxyl ion discharge results in forming oxygen, water, and an electrical current. The electrical current generated at the anode 11 may be used to supplement the electrical current from the power source 14 being supplied to the cathode 12. At the cathode 12, the electrical current is received and used to decompose water from the electrolyte solution into hydroxyl ions and hydrogen. Hydrogen is produced in atomic form and is immediately absorbed by the hydrogen storing cathode 12 and stored in metal hydride form within the cathode before it can recombine to form molecular hydrogen. As electrolysis continues, more and more hydrogen is produced and absorbed by the cathode until the cathode 12 is completely hydrided. Heat generated as a result of the absorption of hydrogen into the hydrogen storage alloy may be utilized to supplement the heat needed to operate electrolysis efficiently at elevated temperatures eliminating the need to remove the heat of hydride formation.

Once the cathode has become completely hydrided, the electrolysis process is ceased and the fully hydrided cathode is removed and replaced with an unhydrided cathode. Since the electrolysis and the hydrogen absorption process are very efficient a coulometer or charge accumulator may be used to monitor the end of charge activity. The fully hydrided cathode is then stored and shipped to end users as a supply of hydrogen. The hydrogen is then removed as needed by applying heat to the cathode and supplied as needed. Once all of the hydrogen has been removed from the cathode, the cathode may be returned and recharged with hydrogen via electrolysis. The amount of hydrogen capable of being stored in the cathode is dependent upon the size of the cathode and the capacity of the hydrogen storage alloy comprising the cathode. These characteristics may be varied as needed to vary the amount of hydrogen stored within each cathode.

To efficiently store the hydrided cathode and efficiently supply hydrogen therefrom, the cathode may be placed in a pressure containment vessel. The size and strength of the pressurized vessel will depend on the final pressure needed. However, since the hydrides generally operate at relatively low pressures, the pressure containment vessels will not have to be as thick or as strong as the compressed gas cylinders where hydrogen is typically stored at pressures of at least 2000 psi. Since the amount of hydrogen released is dependent on the temperature, the amount of the hydrogen stream needed can be regulated by regulating the applied external temperature. The hydrogen stream supplied to various applications does not require a high pressure, since most of the applications that require a supply of hydrogen require only at slightly higher than ambient pressure to maintain a minimum pressure differential. A pressurized hydrogen stream can then be supplied from the pressure containment vessel for a variety of applications requiring a stream of hydrogen such as fuel cells, hydrogen internal combustion engines, chemical reactions utilizing hydrogen, etc. To aid in the release of hydrogen from the hydrided cathode, heat may be supplied to the cathode from a source of heat in thermal communication with the cathode and/or the pressure containment vessel. The source of heat may be chosen from heat exchangers, fuel combustors, electrical heaters, fuel cell exhaust, and hydrogen internal combustion engine exhaust. The heat sources may supply heat to the outside of the vessel or the inside of the vessel. In the case of heat being supplied to the outside of the vessel, the vessel is preferably designed to allow for high heat transfer throughout the vessel structure allowing a substantial amount of heat to reach the cathode. In the case of heat being supplied to the inside of the vessel, heat exchanger tubing may be utilized within the vessel to provide a substantial amount of heat to the cathode. Hydrogen may also be removed from the pressure containment vessel by lowering the pressure within the vessel via a vacuum. This may be advantageous where heating of the vessel is difficult or undesirable.

Alternatively to storing the cathode in its structural form in the pressure containment vessel, the cathode active material of the cathode may be ground into a powder form and placed in a pressure containment vessel. In such case, once the hydrogen has been removed from the cathode active material, the unhydrided cathode active material would be formed once again into a cathode. By forming a powder from the cathode active material, the release of hydrogen from the hydrided cathode active material may be operated more efficiently due to the higher amount of surface area of the cathode active material exposed to the supply of heat. A specially designed pressure containment vessel that may be used with the ground cathode active material is disclosed in U.S. patent application Ser. No. 10/143,243, entitled "A Honeycomb Hydrogen Storage Structure", now U.S. Pat. No. 6,709,479, the disclosure of which is herein incorporated by reference.

The electrolysis reaction may be powered by any number of power sources capable of providing the requisite electrical current to the electrolysis reaction. Preferably, the electrolysis reaction is powered by electricity produced from non-fossil fuel sources such as solar power, wind power, hydroelectric power, geothermal power, etc, however, fossil fuel sources of power may be used as needed. Except for the solar power which requires sunlight to produce electricity (limited to daytime operation only), other non-fuel power sources can operate nonstop thereby allowing nonstop hydrogen production.

Figure 2:
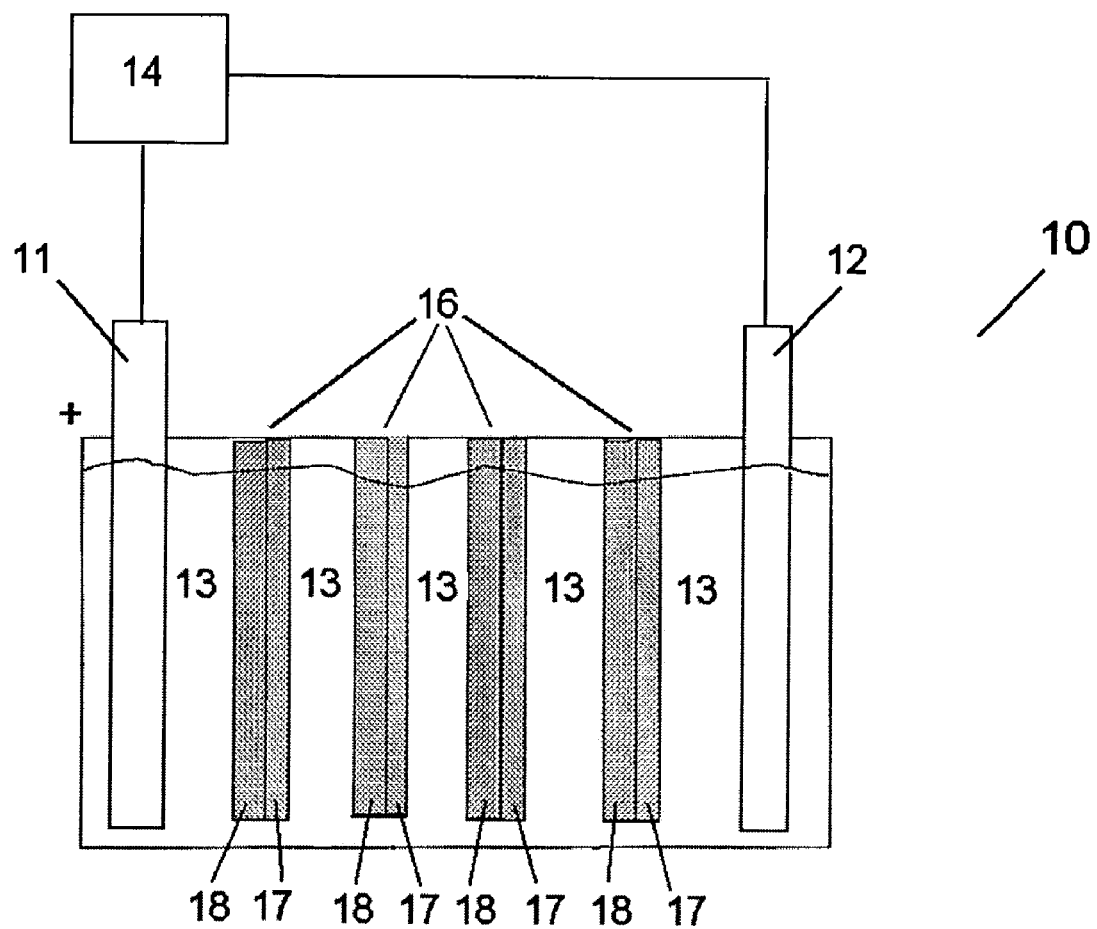
FIG. 2, is a depiction of an alternative embodiment of the electrolytic cell wherein bipolar electrodes are utilized to increase hydrogen production.

In an alternative embodiment of the present invention as shown in FIG. 2, one or more bipolar electrodes 16 may be used to increase the production of hydrogen. The bipolar electrodes 16 are placed in the alkaline solution 13 between the anode 11 and the cathode 12 without being electrically connected to the anode or cathode. Each bipolar electrode 16 has an anode side 17 and a cathode side 18 supported by a substrate. The anode side 17 may be comprised of the anode active material as used in the anode 11 and the cathode side 18 may be comprised of the cathode active material as used in the hydrogen storing cathode 12. The substrate may be any of those used in the anodes or cathodes earlier described. The bipolar electrode may also be a nickel sheet with cathode active material deposited on one side of the sheet with the nickel sheet being the anode side and the cathode active material being the cathode side of the bipolar electrode. When placed in the alkaline solution between the anode and cathode, the anode side of the bipolar electrode faces the cathode and the cathode side of the bipolar electrode faces the anode. Hydrogen is generated and stored on the cathode side in the same manner as the cathode, while oxygen is generated on the anode side. When placed in the electrolytic cell, the bipolar electrode is positioned so as not to let oxygen generated on the anode side contact the cathode side of the electrode. This may be accomplished by placing the bipolar electrodes in plastic insulating frames and/or using proper sealing. As with the cathode, once the cathode side of the bipolar electrode has become completely hydrided, the bipolar electrode is removed and replaced with an unhydrided bipolar electrode. The fully hydrided bipolar electrode is then stored and shipped to end users as a supply of hydrogen in the same manner as the hydrogen storing cathode.

The foregoing is provided for purposes of explaining and disclosing preferred embodiments of the present invention. Modifications and adaptations to the described embodiments, particularly involving changes to the shape of the vessel and the types of hydrogen storage alloy utilized in the cathode will be apparent to those skilled in the art. These changes and others may be made without departing from the scope or spirit of the invention in the following claims.

What is claimed is:

1. A method for the production and storage of hydrogen as a metal hydride comprising the steps of:
   1) producing a supply of hydrogen in an electrolytic cell having an anode and a hydrogen storing cathode by applying an electrical current across said anode and said hydrogen storing cathode, said anode and said hydrogen storing cathode being in contact with an alkaline solution;
   2) absorbing said supply of hydrogen as it is produced with said hydrogen storing cathode thereby forming a metal hydride
   3) removing said hydrogen storing cathode from said electrolytic cell once said hydrogen storing cathode has become at least partially hydrided;
   4) storing said one or more hydrogen storing cathodes in a pressure containment vessel adapted to supply hydrogen desorbed from said one or more hydrogen storing cathodes from said containment vessel; and
   5) providing heat to said pressure containment vessel to desorb said hydrogen from said one or more hydrogen storing cathodes.

2. The method according to claim 1, wherein said hydrogen storing cathode comprises a hydrogen storage alloy.

3. The method according to claim 2, wherein said hydrogen storage alloy is selected from Rare-earth metal alloys, Misch metal alloys, zirconium alloys, titanium alloys, magnesium/nickel alloys, or mixtures and alloys thereof.

4. The method according to claim 2, wherein said hydrogen storing cathode further comprises one or more elements adapted to dissolve out of said hydrogen storing cathode upon exposure to said alkaline solution thereby increasing the porosity of said hydrogen storing cathode.

5. The method according to claim 4, wherein said one or more elements are chosen from aluminum or zinc.

6. The method according to claim 1, wherein said hydrogen storing cathode includes one or more flow channels providing pathways for hydrogen to enter and exit said cathode.

7. The method according to claim 1, wherein said anode comprises a substrate with a catalytic material deposited thereon.

8. The method according to claim 7, wherein said substrate is selected from the group consisting of a metal sheet, expanded metal, foil, wire mesh, or screen.

9. The method according to claim 7, wherein said substrate includes nickel, steel, titanium, graphite, copper, or mixtures thereof.

10. The method according to claim 7, wherein said catalytic material comprises a host matrix including Co, Ni, or Mn.

11. The method according to claim 10, wherein said catalytic material further includes Co, Ni, Sr, Li, K, Sn, C, O, Mn, Al, or Ru.

12. The method according to claim 1, wherein said electrical current is supplied from a non-fossil fuel source of power.

13. The method according to claim 12, wherein said non-fossil fuel source of power is selected from solar power, wind power, hydroelectric power, geothermal power, or combinations thereof.

14. The method according to claim 1, wherein said source of heat is a heat exchanger, a fuel combustor, a catalytic combustor, or a gaseous exhaust stream.

15. The method according to claim 1, wherein said electrolytic cell further comprises one or more bipolar electrodes positioned between said anode and said hydrogen storing cathode in said alkaline solution, said one or more bipolar electrodes having an anode side and a cathode side adapted to evolve and store hydrogen in metal hydride form.

16. The method according to claim 15, further comprising the steps of:
   1) removing said one or more bipolar electrodes from said electrolytic cell once said cathode side has become completely hydrided;

2) storing said one or more bipolar electrodes in a pressure containment vessel adapted to supply hydrogen desorbed from said one or more bipolar electrodes from said containment vessel; and 3) providing heat to said pressure containment vessel to desorb said hydrogen from said one or more bipolar electrodes.

17. The method according to claim 16, wherein said cathode side of said bipolar electrode comprises a hydrogen storage alloy.

18. The method according to claim 16, wherein said heat is provided from a heat exchanger, a fuel combustor, a catalytic combustor, or a gaseous exhaust stream.

* * * * *